United States Patent
Brandon et al.

(10) Patent No.: US 8,139,049 B1
(45) Date of Patent: Mar. 20, 2012

(54) CORDLESS SCANNER AND STYLUS

(75) Inventors: John E. Brandon, San Rafael, CA (US); Kevin J. Mills, Palo Alto, CA (US)

(73) Assignee: Socket Mobile, Inc., Newark, CA (US)

( * ) Notice: Subject to any disclaimer, the term of this patent is extended or adjusted under 35 U.S.C. 154(b) by 1539 days.

(21) Appl. No.: 11/082,191

(22) Filed: Mar. 16, 2005

Related U.S. Application Data

(60) Provisional application No. 60/553,909, filed on Mar. 17, 2004.

(51) Int. Cl.
*G06F 3/033* (2006.01)
*G09G 3/22* (2006.01)

(52) U.S. Cl. ........................................ 345/179; 345/183

(58) Field of Classification Search .................. 345/173, 345/179, 183; 178/19.01–19.05, 18.01, 18.03–18.09; 235/462.01, 235/462.11, 462.13, 462.15, 462.45, 462.46, 235/472, 467; 382/312, 313; 358/498, 473
See application file for complete search history.

(56) References Cited

U.S. PATENT DOCUMENTS

| | | | | |
|---|---|---|---|---|
| 5,369,262 A | * | 11/1994 | Dvorkis et al. | ................ 345/179 |
| 5,635,682 A | * | 6/1997 | Cherdak et al. | ............ 178/19.01 |
| 6,290,134 B1 | * | 9/2001 | Rando et al. | ............. 235/472.01 |
| 6,655,597 B1 | * | 12/2003 | Swartz et al. | ............ 235/462.45 |

* cited by examiner

*Primary Examiner* — Kevin M Nguyen
(74) *Attorney, Agent, or Firm* — Patent Ventures; Bennett Smith; Korbin Van Dyke

(57) ABSTRACT

Convenience, ease of use, efficiency, and economy are some of the benefits of a cordless hand-held device implementing both a scanner and a stylus (active or passive) within a common housing. In an illustrative embodiment, the combined scanner/stylus device is ergonomically shaped and sized for extended comfortable use. During scanning, the device is generally held and aimed at a scan target using one hand as one would hold and aim a small flashlight. The long-axis of the device is thus kept generally parallel with an extended thumb, a scan button being positioned such that the thumb naturally rests atop it for selectively initiating a scan. To write on or tap on the input area of a PDA or Tablet PC, a user of typical coordination can, with the one hand holding the device, spin (rotate) the device to a position common for holding a writing implement.

89 Claims, 5 Drawing Sheets

US 8,139,049 B1

CORDLESS SCANNER AND STYLUS

CROSS REFERENCE TO RELATED APPLICATIONS

This application claims the benefit of U.S. Provisional Patent Application Ser. No. 60/553,909, filed Mar. 17, 2004) entitled CORDLESS SCANNER AND STYLUS, and wherein the foregoing application is herein incorporated by reference for all purposes.

FIELD OF THE INVENTION

The present invention relates generally to computing peripherals. More specifically, it relates to peripherals held by a user during operation.

BRIEF DESCRIPTION OF THE DRAWINGS

Various embodiments of the invention are disclosed in the following detailed description and the accompanying drawings.

DETAILED DESCRIPTION

Figure 1:
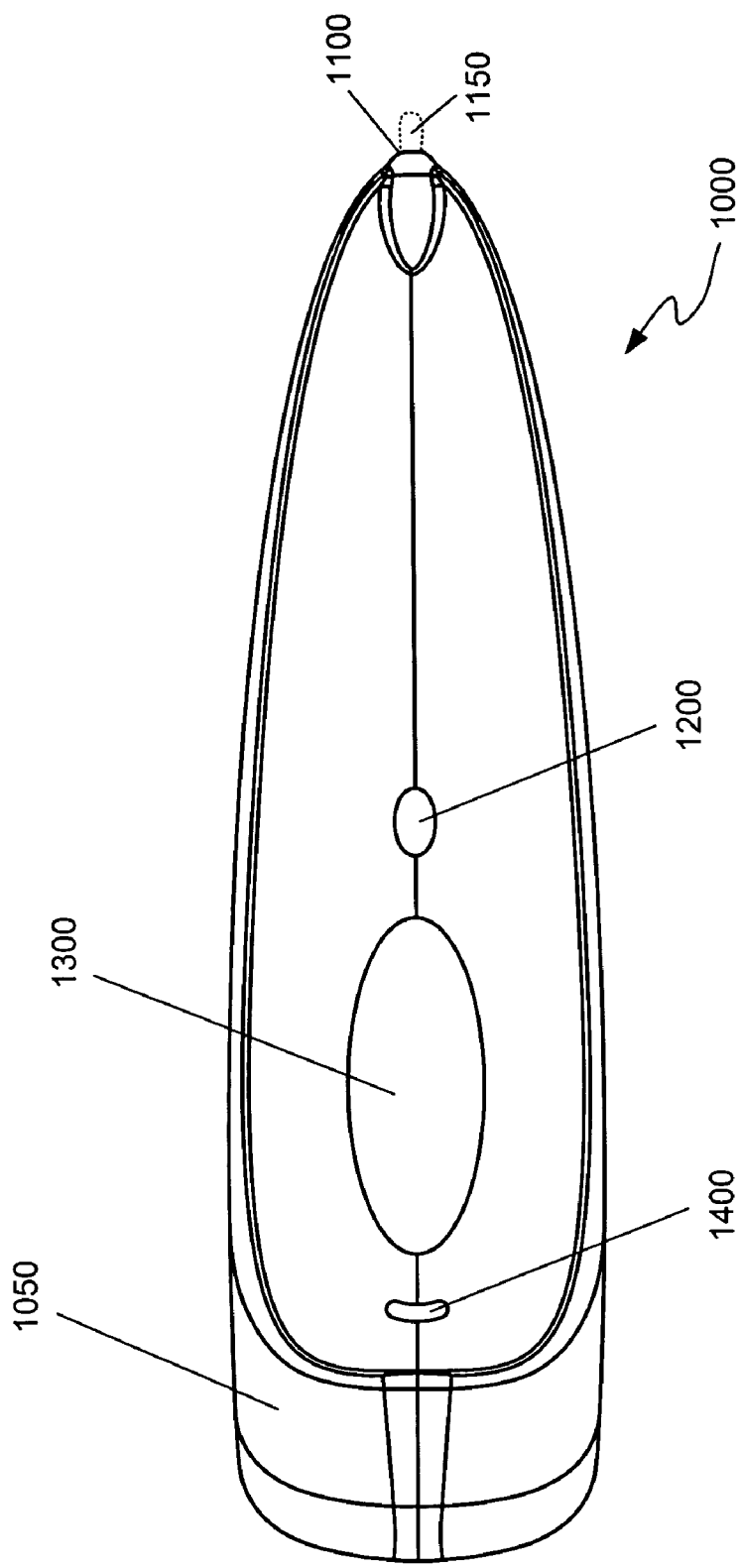
FIG. 1 illustrates a back view of a cordless device 1000 with both scanner and stylus nib assembly 1150, in accordance with an illustrative embodiment.

The invention can be implemented in numerous ways, including as a process, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This Introduction is included only to facilitate the more rapid understanding of the Detailed Description. The invention is not limited to the concepts presented in the Introduction, as the paragraphs of any introduction are necessarily an abridged view of the entire subject and are not meant to be an exhaustive or restrictive description. For example, the Introduction that follows provides overview information limited by space and organization to only certain embodiments. Other embodiments, including those to which claims will ultimately be drawn, are discussed throughout the balance of the specification. Furthermore, the invention is not limited to just the embodiments disclosed in this disclosure, all of which are merely illustrative examples. As is discussed in more detail in the Conclusions, the invention encompasses all possible modifications and variations within the scope of the issued claims, which are appended to the very end of the issued patent.

Convenience, ease of use, efficiency, and economy are some of the benefits of a cordless hand-held device implementing both a scanner and a stylus within a common housing. The device is particularly useful to users performing data entry via cordless (or wireless) scanning into portable computing hosts, such as Personal Digital Assistants (PDAs) and Tablet Personal Computers (Tablet PCs). The portable hosts typically have digitizers for user input of handwriting, gestures, and taps. Using the hybrid device taught herein, such users no longer need to keep track of both a separate scanner and a separate stylus as they constantly switch between these tools as they go about their job.

In an illustrative embodiment, the combined scanner/stylus device is ergonomically shaped and sized for extended comfortable use. During scanning, the device is generally held and aimed at a scan target using one hand as one would hold and aim a small flashlight. The long-axis of the device is thus kept generally parallel with an extended thumb, a scan button being positioned such that the thumb naturally rests atop it for selectively initiating a scan. The concept is equally applicable to optical and Radio Frequency (RF) scanning, including the scanning of bar codes and Radio Frequency IDentifier (RFID) tags. Applicable bar code symbologies include (but are not limited to) any of the linear, or one-dimensional (1D), stacked, or two-dimensional (2D), composite, and postal bar code types.

To write on or tap on the input area of a PDA or Tablet PC, the user need not put down the scanner and pick up a separate stylus. Instead a user of typical coordination can, with the one hand holding the device, spin (rotate) the device to a position common for holding a writing implement. The concept is equally applicable for use with either active or passive digitizers using either active or passive styli.

Focusing for the moment on just one of the major device features, there are two equally valid and equivalent perspectives for describing the stylus functionality. The nomenclature used necessarily depends from which of these perspectives one employs, so it is important to distinguish between them. In a first perspective, the device consists of a stylus holder (plus cordless scanner) for one of a plurality of stylus types. In a second perspective, the device as a whole is a stylus (plus cordless scanner), which is configured using one of a plurality of removable stylus nib (tip) types. The balance of this disclosure is with respect to the second perspective.

The nib of the stylus is optionally implemented via a modular removable cartridge-like assembly, referred to hereinafter as the stylus nib assembly, which determines the stylus type. As will be discussed further below, generally the stylus nib assembly includes not just the nib, but also an attachment portion (for removable attachment to the device) and a body portion (between the nib and the attachment portion). Use of a removable stylus nib assembly permits manufacture, distribution, and sales of the device sans the stylus nib, so as to avoid unnecessary premature binding of the cordless device to a particular stylus type. This flexibility is also useful to the user, who may desire to switch between multiple stylus types at one or more times during ownership of the device. Replacement of a broken or lost stylus nib is also facilitated.

Those skilled in the art will appreciate that the stylus nib assembly of the device may be chosen to be compatible with any of many active and passive-digitizer technologies. PDAs generally use resistive passive-digitizers and the stylus is generally of non-conductive plastic. Other passive-digitizer technologies include (but are not limited to): capacitive, near-field, acoustic wave, and infrared methods. Each of these has different requirements for the styli. Capacitive and near-field technologies generally require an at least somewhat conductive stylus, while acoustic wave and infrared generally require an energy absorbing stylus.

Candidate styli nib assembly types include (but are not limited to): a) simple stubs without any electronic components, e.g., for use with PDAs and similar portable computing hosts having passive digitizers (including each of the passive types described above); b) styli having embedded passive components, e.g., for use with Tablet PCs using the Wacom Electro-Magnetic Resonance (EMR) active digitizer technology; c) active styli having an embedded RF transmitter, e.g., for use with Tablet PCs using the FinePoint Innovations active digitizer technology; and d) writing points (such as ball-points, felt-tips, fountain pen nibs, and pencil leads).

Illustrative Combinations

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first embodiment for use in conjunction with at least one wireless enabled host having an associated digitizer for user input, the first embodiment including: a scanning engine; a wireless interface to couple the scanning engine to the wireless enabled host; a housing at least partially containing the scanning engine and the wireless interface; a stylus nib protruding at least partially from the housing; wherein the housing is of a size and shape suitable for holding and operating the first embodiment with one hand in either of a first orientation and a second orientation; and wherein the first embodiment functions as a cordless scanner for wirelessly sending scan data to the wireless enabled host when operated in the first orientation and functions as a stylus for inputting user data via the host digitizer when operated in the second orientation. The first embodiment, wherein the stylus nib is fixably attached to the embodiment. The first embodiment, wherein the stylus nib is removably attached to the embodiment housing.

A second embodiment, including all of the aspects of the first embodiment, and wherein the stylus nib is part of a removable stylus nib assembly, and wherein the second embodiment includes a stylus mounting assembly at least partially within the housing for removably attaching the stylus nib assembly to the second embodiment. The second embodiment, wherein the stylus nib stylus mounting assembly includes a helical socket for removable screw mounting of a stylus nib assembly having compatible threads. The second embodiment, wherein the stylus mounting assembly includes a slotted socket for removable bayonet mounting of a stylus nib assembly having matching bayonet pins. The second embodiment, wherein the stylus mounting assembly includes a socket with an opposable catch for removable mounting via capture of a stylus nib assembly circumscribed with a tapered recess.

A third embodiment, including all of the aspects of either the first or second embodiment, wherein the scanning engine uses optics based scanning. The third embodiment, wherein a scanner window is at the opposite end of the housing from the stylus nib. The third embodiment, wherein a scanner window is at the same end of the housing as the stylus nib. The third embodiment, wherein the scanning engine is for scanning bar codes. The third embodiment, wherein the scanning engine includes a laser scanner. The third embodiment, wherein the scanning engine includes a 1D CCD array. The third embodiment, wherein the scanning engine includes a 2D CCD imager.

A fourth embodiment, including all of the aspects of either the first or second embodiment, wherein the scanning engine uses RF based scanning. The fourth embodiment, wherein the scanning engine is for scanning RFID tags. The fourth embodiment, wherein the scanning engine uses inductive coupling techniques. The fourth embodiment, wherein the scanning engine uses perturbated reflected RF energy techniques. The fourth embodiment, wherein the scanning engine uses microwave backscatter techniques.

A fifth embodiment, including all of the aspects of any of the first through fourth embodiments, wherein the wireless interface is compatible with an industry standard for personal area wireless networking. The forgoing embodiment wherein the industry standard is compatible with the Bluetooth standard. A sixth embodiment, including all of the aspects of any of the first through fourth embodiments, wherein the wireless interface is compatible with an industry standard for local area wireless networking. The forgoing embodiment wherein the industry standard is compatible with the WiFi standard. A seventh embodiment, including all of the aspects of any of the first through fourth embodiments, wherein the wireless interface is infrared.

An eighth embodiment, including all of the aspects of any of the first through seventh embodiments, wherein the stylus nib assembly is passive and when the embodiment is used in the second orientation it functions as a passive stylus. The eighth embodiment, wherein the passive stylus nib assembly is for use with resistive passive digitizers. The eighth embodiment, wherein the passive stylus nib assembly is for use with capacitive passive digitizers. The eighth embodiment, wherein the passive stylus nib assembly is for use with near-field passive digitizers. The eighth embodiment, wherein the passive stylus nib assembly is for use with acoustic wave passive digitizers. The eighth embodiment, wherein the passive stylus nib assembly is for use with infrared passive digitizers. The eighth embodiment, wherein the passive stylus nib assembly has electrical components having at least one resonant frequency. The foregoing embodiment, wherein the passive stylus nib assembly is for use with active digitizers. The foregoing embodiment, wherein the passive nib assembly is compatible with active digitizers based on the Wacom EMR technology. The eighth embodiment, wherein the passive stylus nib assembly has electrical components having at least two resonant frequencies and at least one switch for selecting between the frequencies. The foregoing embodiment, wherein the passive stylus nib assembly is for use with active digitizers. The foregoing embodiment, wherein the passive nib assembly is compatible with active digitizers based on the Wacom EMR technology.

A ninth embodiment, including all of the aspects of any of the first through seventh embodiments, wherein the stylus nib assembly is active and when the embodiment is used in the second orientation it functions as an active stylus. The ninth embodiment, wherein the active stylus nib assembly includes an RF transmitter. The foregoing embodiment, wherein the active stylus nib assembly is for use with active digitizers. The foregoing embodiment, wherein the active stylus nib assembly is compatible with active digitizers based on the FirePoint Innovations technology.

A tenth embodiment, including all of the aspects of any of the first through seventh embodiments, wherein the stylus nib assembly includes a point for writing on paper. The tenth embodiment, wherein the stylus nib assembly includes a ball-point pen. The tenth embodiment, wherein the stylus nib assembly includes a felt-tip pen. The tenth embodiment, wherein the stylus nib assembly includes a mechanical pencil. The tenth embodiment, wherein the stylus nib assembly includes a fountain pen.

Scanner and Stylus Details

FIGS. 1-5 detail an illustrative embodiment of device 1000. FIG. 1 shows a first view, called the back view, of device 1000. Device 1000 includes a casing 1050, stylus mount 1100, power button 1200, scan button 1300, and indicators 1400. Stylus nib assembly 1150 is shown dashed to emphasize that it is optionally removable.

Figure 2:
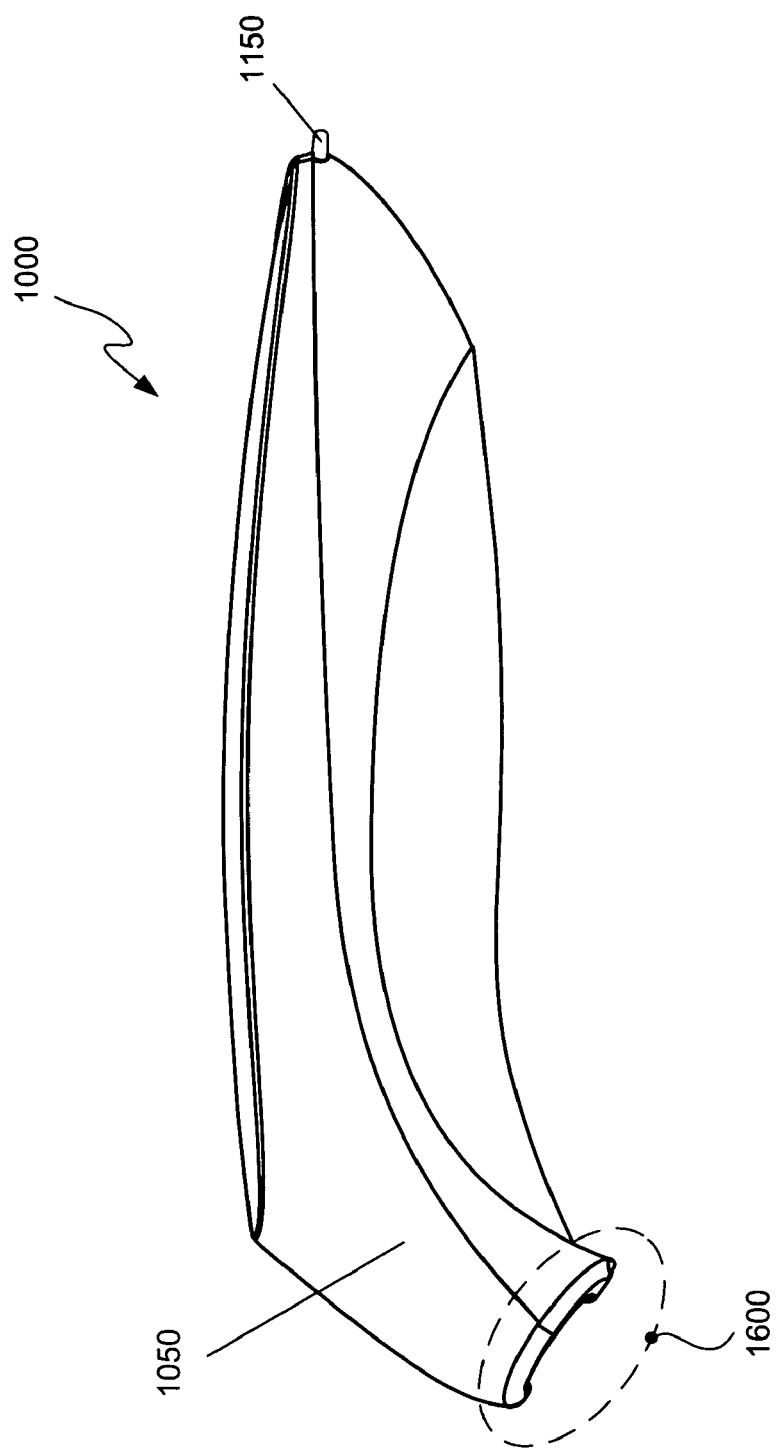
FIG. 2 illustrates a left-side view of the device of FIG. 1.

FIG. 2 shows a second view, called the left-side view, of device 1000. Casing 1050 is shown, as before. Newly visible in this view is a side perspective of scan window 1600. In this view, stylus nib assembly 1150 has been attached (via the stylus mount 1100 of FIG. 1). The scan window is an optically transparent opening typical of scan engine embodiments that use optical technology, such as bar-code scanners that employ laser-scanning or CCD imaging. RFID technology scanners will not require such an optically transparent scan window. However, if portions of the housing block radio-frequencies, an analogous RF-transparent window may be required for proper operation.

Figure 3:
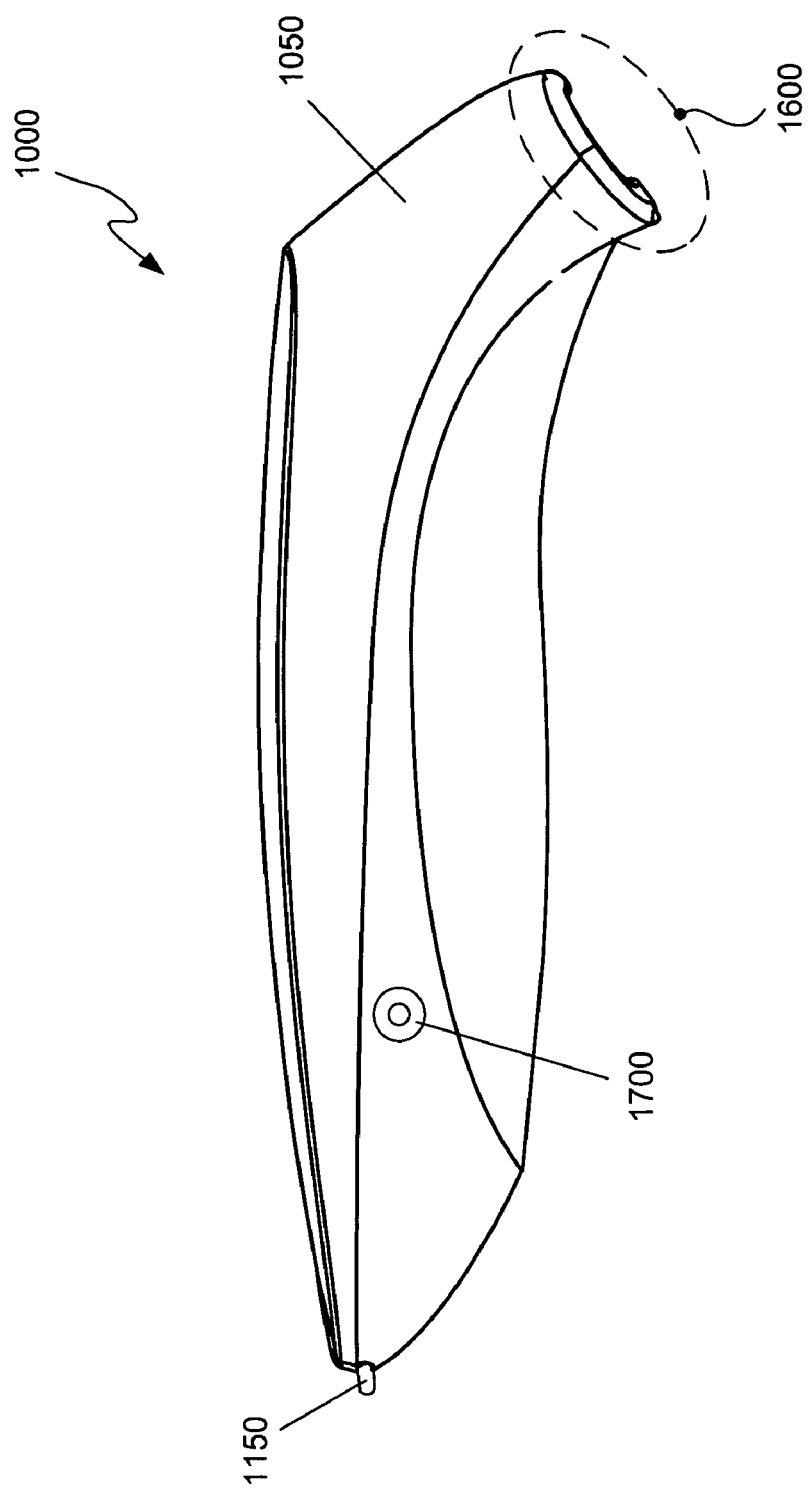
FIG. 3 illustrates a right-side view of the device of FIG. 1.
Figure 4:
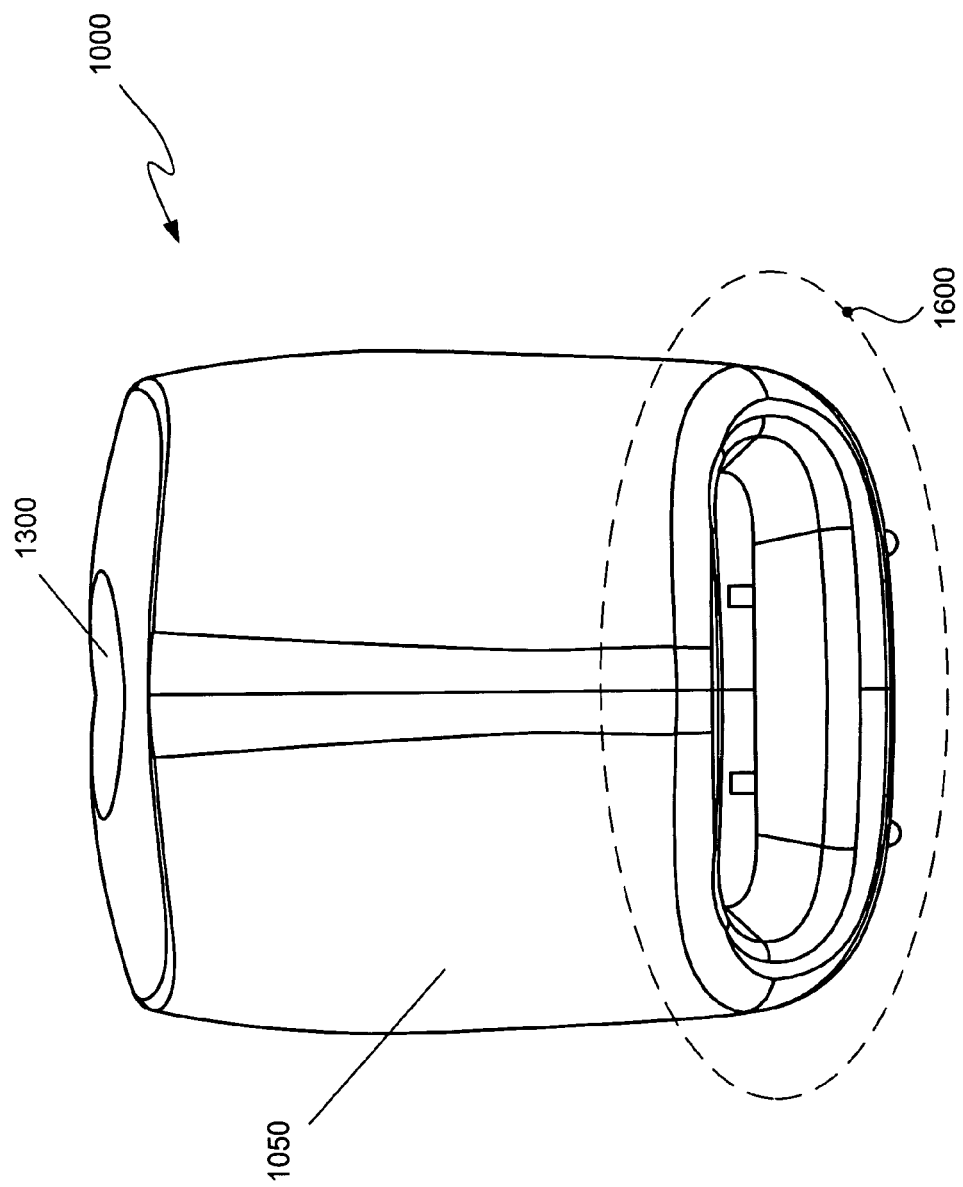
FIG. 4 illustrates an end-view (away from the stylus nib) of the cordless device of FIG. 1.

FIG. 3 shows a third view, called the right-side view, of device 1000. The stylus nib assembly 1150 and the scan window 1600 are again visible. Power connector 1700 (for charging the internal battery or battery stack), is newly visible in this view. FIG. 4 shows a fourth view, called front-end view, of device 1000. Casing 1050, scan button 1300, and scan window 1600 are again visible.

Figure 5:
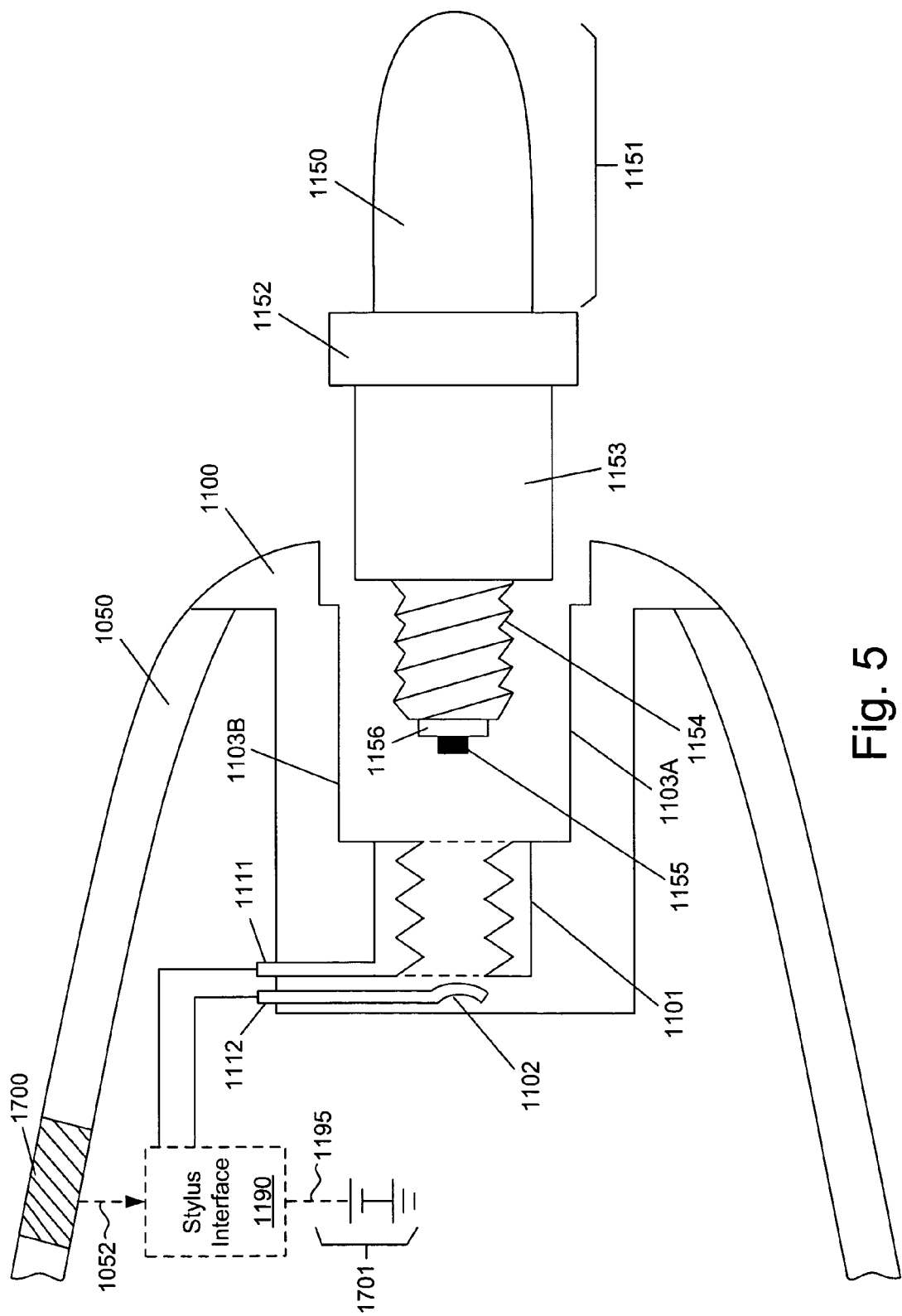
FIG. 5 is a conceptual drawing showing removable stylus nib assembly 1150 in conjunction with a cut-away view of device 1000 of FIG. 1, including detail of stylus mount 1100, optional stylus interface 1190, and related components.

A stylus mounting assembly is used to mount the chosen removable stylus nib assembly to the device. The stylus mounting assembly provides for mechanical coupling of the assembly to the device housing, a mechanical guide for receiving the stylus nib assembly, a mechanical restraint for the removable stylus nib assembly, and optionally electrical connections for coupling to active stylus types. FIG. 5 provides detail of an illustrative embodiment of a stylus mounting assembly for an illustrative modular removable stylus nib assembly. A screw-like attachment scheme is illustrated, but those skilled in the art will recognize that a bayonet-mount technique (such as used to mate BNC-style connectors and certain light bulbs and flash bulbs) and other common mechanical attachment techniques (such as snap-into-detent) can be equivalently used.

In FIG. 5, stylus mount 1100 is shown attached to the end of housing 1050. Stylus mount 1100 includes guide walls 1103A and 1103B and an attachment assembly comprising socket ring 1101 (shown in a side cut-away view) and socket center contact 1102 for mechanically securing a compatible stylus nib assembly. Stylus nib assembly 1150 is implemented as a cartridge-like assembly that includes nib 1151, collar 1152, body 1153, mounting threads 1154, and optional center conductor 1155 and insulator 1156.

In FIG. 5, the stylus nib assembly 1150 is shown in a position ready to be mounted. Mounting is accomplished by insertion of the stylus nib assembly 1150 into stylus mount 1100 and rotational engagement of the mounting threads 1154 into the socket ring 1101 until the stylus nib assembly is friction held finger-tight by the socket ring. If optional center conductor 1155 and insulator 1156 are present, then at this point the center conductor 1155 should be fully engaged with center contact 1102 to establish reliable electrical continuity between mounting threads 1154 and electrical contact 1111, and between center conductor 1155 and electrical contact 1112.

Active styli, such as the FinePoint Innovations technology, need power that is delivered via electrical contacts 1111 and 1112. In FIG. 5, power source 1701 is shown coupled to 1112 and 1111 via coupling 1195 and stylus interface 1190 to provide power for such an active stylus. Power is preferably taken from the same source (a battery or battery stack) that powers the scanner, although separate sources could be used if the implementation specifics warrant such. Stylus interface 1190 further provides battery charging functions using power delivered from power connector 1700 via coupling 1052.

In other embodiments, the body of an attached stylus nib assembly may extend at least partially from the device, and further optionally have a portion with a diameter that extends beyond the diameter of the stylus mount opening. Such an enlarged body portion would facilitate the inclusion of at least one switch within the stylus nib assembly, such as the stylus switches used to select between multiple resonant frequencies in certain implementations of the Wacom EMR technology.

Alternative device embodiments that need only a passive permanent stylus may dispense entirely with the complexity of stylus interface 1190, stylus nib assembly 1150, and stylus mount 1100 and mount the nib 1151 directly to the housing. Other embodiments of the stylus nib assembly may not use an explicit collar. Additional embodiments envisioned include: a device in which the stylus mount is placed at the same end as the scanner window, and embodiments in smaller form factors.

Reduction in the size of the illustrative embodiment is limited principally by the size of the scan engine and the internal battery. Those skilled in the art will recognize there are design trade-offs (such as cost, schedule, battery-life, degree of customization) that must be evaluated against the resulting size of the enclosure. It is within the grasp of the current state of the art for a substantially smaller scanner to be implemented, having an industrial design form factor comparable to that of a conventional large writing implement (such as that of a ¼-inch Felt-tip Marker pen). Such a smaller sized scanner/stylus is suitable to fit in a shirt-pocket and preferably includes a pocket-clip. Such a smaller sized scanner/stylus may be more desirable when use as a stylus is anticipated to be the dominant use. When use as a scanner is anticipated to be the dominant use, the size of FIGS. 1-4 may be preferable.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, the type of technology used may generally be varied in each component block. The names given to interconnect and logic are merely illustrative, and should not be construed as limiting the concepts taught. Also, unless specifically stated to the contrary, the value ranges specified, the maximum and minimum values used, or other particular specifications (such as the particular version of an interface standard or component), are merely those of the illustrative embodiments, can be expected to track improvements and changes in implementation technology, and should not be construed as limitations.

Functionally equivalent techniques known to those of ordinary skill in the art may be employed instead of those illustrated to implement various components or sub-systems. Specific variations may include, but are not limited to: differences in partitioning; different form factors and configurations; use of different interface standards; and other variations to be expected when implementing the concepts taught herein in accordance with the unique engineering and business constraints of a particular application.

The embodiments have been illustrated with detail and environmental context well beyond that required for a minimal implementation of many aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other portable peripheral applications, and are not limited to the particular application or industry of the illustrated embodiments. The invention is thus to be construed as including all possible modifications and variations encompassed within the scope of the claims appended to the issued patent.

What is claimed is:

1. A method comprising:
holding a graspable shaft portion of a wireless handheld device in a first manner with a hand and scanning an item via a scanning window at least partially comprised in an angled extension portion of the wireless handheld device, a long axis of the graspable shaft portion forming an obtuse angle with respect to a central axis of the angled extension portion;
entering stylus data via a stylus included in the device while holding the graspable shaft portion of the device in a second manner with the hand; and
wherein a scan button is positioned on the graspable shaft portion near the angled extension portion and away from the stylus and while holding the device in the first manner, the scan button is further positioned to act as a natural rest for a thumb of the hand, the scan button enables selective initiation of the scanning, and the device is enabled to be aimed during the scanning along a projection of the central axis of the angled extension portion.

2. The method of claim 1, further including:
orienting the device between the manners.

3. The method of claim 2, further including:
orienting the device from the first manner to the second manner.

4. The method of claim 2, further including:
orienting the device from the second manner to first the manner.

5. The method of claim 1, further including:
rotating the device from the first manner to the second manner.

6. The method of claim 1, further including:
rotating the device from the second manner to first the manner.

7. The method of claim 1, wherein the hand moves the device from the first manner to the second manner.

8. The method of claim 1, wherein the hand moves the device from the second manner to the first manner.

9. The method of claim 1, wherein
the item is a first item; and
further including scanning a second item while holding the device in the first manner.

10. The method of claim 1, wherein
the stylus data is first stylus data; and
further including entering second stylus data via the stylus while holding the device in the second manner.

11. The method of claim 1, wherein
the act of scanning is before the act of entering.

12. The method of claim 1, wherein
the act of entering is before the act of scanning.

13. The method of claim 1, wherein the scanning includes scanning at least one of
a bar code; and
a Radio Frequency IDentifier (RFID) tag.

14. The method of claim 1, wherein the stylus data includes at least one of
handwriting data;
gesture data; and
tap data.

15. The method of claim 1, wherein the stylus is at least one of
a passive stylus; and
an active stylus.

16. The method of claim 1, wherein the stylus is at least one of
temporarily coupled to the device; and
permanently coupled to the device.

17. The method of claim 1, wherein the stylus is a digitizer-compatible stylus.

18. The method of claim 17, wherein the digitizer-compatible stylus uses at least one of
a passive-stylus technology; and
an active-stylus technology.

19. The method of claim 1, further including wirelessly communicating results of the scanning.

20. The method of claim 19, wherein the wirelessly communicating is in accordance with at least one of
a Bluetooth standard;
a Zigbee standard; and
a WiFi standard.

21. A handheld device
a housing comprising a graspable shaft portion and an angled extension portion, a long axis of the graspable shaft portion forming an obtuse angle with respect to a central axis of the angled extension portion, the angled extension portion at least partially containing a scanning subsystem comprising at least a scanning window;
a stylus nib protruding at least partially from the housing;

a scan button positioned on the graspable shaft portion near the angled extension portion and away from the stylus nib;

wherein the housing is of a size and shape suited to holding and operating the handheld device with one hand in either of a first orientation and a second orientation;

wherein the handheld device functions as a cordless scanner to wirelessly send scan data when operated in the first orientation and functions as a digitizer stylus to generate user digitizer data when operated in the second orientation; and wherein when operating the device in the first orientation, the scan button is further positioned to act as a natural rest for a thumb of the one hand, the scan button enables selective initiation of scanning, and the scanner is enabled to be aimed during the scanning along a projection of the central axis of the angled extension portion.

22. The handheld device of claim 21, wherein the scanning subsystem uses optics based scanning.

23. The handheld device of claim 22, wherein the scanner window is at the opposite end of the housing from the stylus nib.

24. The handheld device of claim 22, wherein the scanner window is at the same end of the housing as the stylus nib.

25. The handheld device of claim 22, wherein the scanning subsystem is for scanning bar codes.

26. The handheld device of claim 22, wherein the scanning subsystem includes at least one of
a laser scanner;
a one-dimensional (1D) CCD array; and
a two-dimensional (2D) CCD imager.

27. The handheld device of claim 21, wherein the scanning subsystem uses Radio Frequency (RF) based scanning.

28. The handheld device of claim 27, wherein the scanning subsystem is for scanning Radio Frequency IDentifier (RFID) tags.

29. The handheld device of claim 27, wherein the scanning subsystem uses at least one of
inductive coupling techniques;
perturbated reflected Radio Frequency (RF) energy techniques; and
microwave backscatter techniques.

30. The handheld device of claim 21, wherein the wireless sending of scan data is compatible with an industry standard for personal area wireless networking.

31. The handheld device of claim 30, wherein the industry standard is compatible with a Bluetooth standard.

32. The handheld device of claim 30, wherein the industry standard is compatible with a Zigbee standard.

33. The handheld device of claim 21, wherein the wireless sending of scan data is compatible with an industry standard for local area wireless networking.

34. The handheld device of claim 33, wherein the industry standard is compatible with a WiFi standard.

35. The handheld device of claim 21, wherein the wireless sending of scan data uses infrared technology.

36. The handheld device of claim 21, wherein the stylus nib is fixably attached to the housing.

37. The handheld device of claim 21, wherein the stylus nib is removably attached to the housing.

38. The handheld device of claim 21, further including:
a stylus mounting assembly at least partially within the housing to enable removably attaching a removable stylus nib assembly to the handheld device; and
wherein the stylus nib is part of the removable stylus nib assembly.

39. The handheld device of claim 38, wherein:
the stylus mounting assembly includes a helical socket to enable removable screw mounting of the removable stylus nib assembly; and
the removable stylus nib assembly has threads compatible with the helical socket.

40. The handheld device of claim 38, wherein:
the stylus mounting assembly includes a slotted socket to enable removable bayonet mounting of the removable stylus nib assembly; and
the removable stylus nib assembly has bayonet pins matching the slotted socket.

41. The handheld device of claim 38, wherein:
the stylus mounting assembly includes a socket with an opposable catch to enable removable mounting via capture of the removable stylus nib assembly; and
the removable stylus nib assembly is circumscribed with a tapered recess.

42. The handheld device of claim 38, wherein the removable stylus nib assembly is passive and when the handheld device is used in the second orientation it functions as a passive stylus.

43. The handheld device of claim 42, wherein the passive stylus nib assembly comprises at least one of
a resistive passive technology;
a capacitive passive technology;
a near-field passive technology;
an acoustic wave passive technology; and
an infrared passive technology.

44. The handheld device of claim 42, wherein the passive stylus nib assembly has electrical components having at least one resonant frequency.

45. The handheld device of claim 44, wherein the passive stylus nib assembly is compatible with active-digitizer technology.

46. The handheld device of claim 45, wherein the passive stylus nib assembly is compatible with Wacom Electro-Magnetic Resonance (EMR) active-digitizer technology.

47. The handheld device of claim 42, wherein the passive stylus nib assembly has electrical components having at least two resonant frequencies and at least one switch for selecting between the frequencies.

48. The handheld device of claim 47, wherein the passive stylus nib assembly is compatible with active-digitizer technology.

49. The handheld device of claim 48, wherein the passive stylus nib assembly is compatible with Wacom Electro-Magnetic Resonance (EMR) active-digitizer technology.

50. The handheld device of claim 38, wherein the removable stylus nib assembly is active and when the handheld device is used in the second orientation it functions as an active stylus.

51. The handheld device of claim 50, wherein the active stylus nib assembly includes a Radio Frequency (RF) transmitter.

52. The handheld device of claim 51, wherein the active stylus nib assembly is compatible with active-digitizer technology.

53. The handheld device of claim 52, wherein the active stylus nib assembly is compatible with FinePoint Innovations active-digitizer technology.

54. The handheld device of claim 38, wherein the removable stylus nib assembly includes a point for writing on paper.

55. The handheld device of claim 54, wherein the removable stylus nib assembly includes at least one of
a ball-point pen;
a felt-tip pen;
a mechanical pencil; and
a fountain pen.

56. A detachable stylus assembly including:
a fastening portion adapted to detachably couple to a handheld device; and
a projecting portion coupled to the fastening portion and adapted to provide stylus input; and
wherein the handheld device includes an enclosure and a scan button, and the device is adapted to wirelessly communicate;
wherein the enclosure includes a receiving portion compatible with the fastening portion and is adapted to receive the detachable stylus assembly;
wherein the enclosure is compatible with operation of the handheld device as a scanner wirelessly providing scan data while in a first alignment in one hand;
wherein the enclosure is compatible with operation of the handheld device as a stylus providing stylus input while in a second alignment in the one hand; and
wherein the scan button is positioned to act as a natural rest for a thumb of the one hand during the operation in the first alignment, and the scan button enables selective initiation of scanning.

57. The detachable stylus assembly of claim 56, wherein:
the fastening portion includes a male receptacle; and
the receiving portion includes a female receptacle adapted to separably mate with the male receptacle.

58. The detachable stylus assembly of claim 57, wherein:
the female receptacle includes a helical socket to enable removable screw mounting of the detachable stylus assembly; and
the male receptacle has threads compatible with the helical socket.

59. The detachable stylus assembly of claim 57, wherein:
the female receptacle includes a slotted socket to enable removable bayonet mounting of the detachable stylus assembly; and
the male receptacle has bayonet pins matching the slotted socket.

60. The detachable stylus assembly of claim 57, wherein:
the female receptacle includes a socket with an opposable catch to enable removable mounting via capture of the detachable stylus assembly; and
the male receptacle is circumscribed with a tapered recess.

61. The detachable stylus assembly of claim 56, wherein the projecting portion includes at least one of
a ball-point pen;
a felt-tip pen;
a mechanical pencil; and
a fountain pen.

62. The detachable stylus assembly of claim 56, wherein the projecting portion includes a nib.

63. The detachable stylus assembly of claim 56, wherein the stylus input is in accordance with at least one of
a passive stylus technology; and
an active stylus technology.

64. The detachable stylus assembly of claim 56, wherein the stylus is compatible with at least one of
a resistive passive technology;
a capacitive passive technology;
a near-field passive technology;
an acoustic wave passive technology; and
an infrared passive technology.

65. The detachable stylus assembly of claim 56, wherein the stylus input is compatible with at least one of
Wacom Electro-Magnetic Resonance (EMR) active digitizer technology; and
FinePoint Innovations active digitizer technology.

66. The detachable stylus assembly of claim 56, wherein a scanning window is formed at a first end of the enclosure and the receiving portion is formed at a second end of the enclosure that is opposite from the first end.

67. The detachable stylus assembly of claim 56, wherein a scanning window and the receiving portion are formed at an end of the enclosure.

68. The detachable stylus assembly of claim 56, wherein the enclosure at least partially encloses at least one of
an optical scanning subsystem comprising at least an optically transparent scanner window; and
a Radio Frequency (RF) scanning subsystem comprising at least an RF transparent scanner window.

69. The detachable stylus assembly of claim 56, wherein the operation of the device as a scanner includes at least one of
scanning a bar code; and
scanning a Radio Frequency IDentifier (RFID) tag.

70. The detachable stylus assembly of claim 56, wherein the wireless communication is via at least one of
a Bluetooth link;
a Zigbee link; and
a WiFi link.

71. The detachable stylus assembly of claim 56, compatible with at least one of
a Personal Digital Assistance (PDA) digitizer technology; and
a Tablet Personal Computer (Tablet PC) digitizer technology.

72. A method including the steps of:
assembling a stylus assembly to a stylus assembly receptacle on a wireless handheld unit; and
wherein the unit includes
a scan button;
a scanning subsystem comprising at least a scanning window,
a housing comprising a graspable shaft portion and an angled extension portion, a long axis of the graspable shaft portion forming an obtuse angle with respect to a central axis of the angled extension portion, the angled extension portion at least partially containing the scanning window and the graspable shaft portion at least partially containing the stylus assembly receptacle;
wherein the housing is suited to hold and operate the unit with one hand in either of a first orientation and a second orientation;
wherein the unit serves as a cordless scanner to wirelessly send scan data when operated in the first orientation and serves as a stylus to enter stylus data when operated in the second orientation; and
wherein the scan button is positioned on the graspable shaft portion near the angled extension portion and away from the stylus and the scan button is further positioned to act as a natural rest for a thumb of the one hand while holding the unit in the first orientation, the scan button enables selective initiation of scanning, and the device is enabled to be aimed during the scanning along a projection of the central axis of the angled extension portion.

73. The method of claim 72, wherein the wirelessly sending of scan data is at least one of Bluetooth standard compatible; Zigbee standard compatible; and WiFi standard compatible.

74. The method of claim 72, further including orienting the unit to scan an item.

75. The method of claim 72, further including orienting the unit to enter stylus data.

76. The method of claim 72, further including scanning an item with the unit.

77. The method of claim 76, further including wirelessly sending results of the scanning of the item to the portable device.

78. The method of claim 72, further including entering stylus data into the portable device.

79. The method of claim 72, further including unassembling the stylus assembly from the stylus assembly receptacle.

80. The method of claim 79, wherein:
the stylus assembly is a first stylus assembly; and
further including assembling a second stylus assembly to the stylus assembly receptacle.

81. A method comprising:
holding a handheld data-entry unit in a first orientation by one hand and obtaining scan data of a first data set via use of a scanning subsystem comprising at least a scanner window, wherein the scanner window is at least partially enclosed in a angled extension portion of a housing of the data-entry unit, the housing further comprising a graspable shaft portion, a long axis of the graspable shaft portion forming an obtuse angle with respect to a central axis of the angled extension portion;
holding the handheld data-entry unit in a second orientation by the one hand and obtaining stylus data of a second data set via use of a stylus nib mounted to an end of the graspable shaft portion away from the angled extension portion; and
wherein the obtaining scan data is at least in part in response to selective activation of scanning by a thumb of the one hand via a scan button positioned on the graspable shaft portion near the angled extension portion and away from the stylus nib and further positioned to act as a natural rest for the thumb during the scanning.

82. The method of claim 81, wherein the data-entry unit, while in the first orientation, functions as at least one of
a barcode scanner; and
a Radio Frequency IDentifier (RFID) tag scanner.

83. The method of claim 81, wherein the stylus nib is a digitizer-compatible stylus nib.

84. The method of claim 83, wherein the digitizer-compatible stylus nib is at least one of
active digitizer compatible; and
passive digitizer compatible.

85. The method of claim 81, wherein the scanning subsystem operates using at least one of
reflective scanning;
one-dimensional (1D) imaging; and
two-dimensional (2D) imaging.

86. The method of claim 81, wherein the scanning subsystem operates according to at least one of
an inductive coupling technique;
a perturbated reflected Radio Frequency (RF) energy technique; and
a microwave backscatter technique.

87. The method of claim 81, wherein:
the communicating of the first data set is done wirelessly.

88. The method of claim 87, wherein the wirelessly communicating is at least one of
Bluetooth standard compatible;
Zigbee standard compatible; and
WiFi standard compatible.

89. The method of claim 87, wherein at least some of the wirelessly communicating at least partially originates from within the housing.

* * * * *